United States Patent [19]

Dods

[11] Patent Number: 4,775,802

[45] Date of Patent: Oct. 4, 1988

[54] MODULAR INTERCONNECTING WIRING SYSTEM WITH MOLDED MATING COMPONENTS

[75] Inventor: Terry E. Dods, Carp, Canada

[73] Assignee: Comstock Canada, Ottawa, Canada

[21] Appl. No.: 149,684

[22] Filed: Jan. 28, 1988

Related U.S. Application Data

[63] Continuation of Ser. No. 868,293, May 28, 1986.

[30] Foreign Application Priority Data

May 8, 1986 [CA] Canada .................................. 508690

[51] Int. Cl.⁴ .......................... H01B 7/30; H02G 3/04; H01R 1/00
[52] U.S. Cl. .................................... 307/147; 307/157; 174/49; 439/502; 439/652
[58] Field of Search .................. 307/147, 157; 174/48, 174/49, 53, 57; 315/317-320, 324; 339/8 R, 14 RP, 17 R, 22 R, 28, 29 R, 147 R, 57, 75 M, 156 R; 362/147, 220, 219

[56] References Cited

U.S. PATENT DOCUMENTS

| | | | |
|---|---|---|---|
| 2,484,092 | 11/1949 | Hopgood | 171/97 |
| 3,715,627 | 6/1973 | DAusilio | 317/99 |
| 4,134,045 | 1/1979 | Quin | 315/324 |
| 4,146,287 | 3/1979 | Johnsson | 339/29 R |
| 4,165,443 | 8/1979 | Figart et al. | 307/147 |
| 4,219,868 | 8/1980 | Bowman | 362/147 |
| 4,272,689 | 10/1981 | Crosby et al. | 307/147 |
| 4,399,371 | 8/1983 | Ziff et al. | 339/14 RP |
| 4,500,796 | 2/1985 | Quin | 307/157 |
| 4,504,891 | 3/1985 | Mazis | 362/219 |

FOREIGN PATENT DOCUMENTS

| | | |
|---|---|---|
| 881128 | 9/1971 | Canada . |
| 1038023 | 5/1978 | Canada . |
| 1063075 | 9/1979 | Canada . |
| 1146249 | 10/1983 | Canada . |
| 1162266 | 2/1984 | Canada . |

OTHER PUBLICATIONS

Descriptive Literature by Dual Lite Inc. entitled "Dual-Lite 727 Series System".

Primary Examiner—Vit W. Miska

[57] ABSTRACT

A modular wiring system including a fixture interceptor for electrically wiring together several overhead light fixtures of an office building using modular components whereby a selected group of fixtures may be locally switched as desired. All components of the system matingly connect with other components through molded connectors and recessed sockets to provide foolproof installation and strong, wear-resistant physical connections. Each fixture is provided with a self-fastening, molded fixture interceptor having recessed input and output fixture sockets. Mating joiner cables connect a power supply to a starting fixture and pairs of successive fixtures, one end of each joiner cable connecting to an input fixture socket of one fixture and the other end to an output fixture socket of another fixture. A molded switching interceptor (i.e. switch tap box) is connected via a joiner cable to the fixture interceptor of the first fixture selected for local switching. Power from a source is provided to a recessed input switching socket of the switching interceptor and this power is then switched through a local switch connected to a recessed switch drop socket of the switching interceptor. The switched power is provided to the first selected fixture and each successive selected fixture connected thereto through joiner cables. Unswitched power is provided to remaining non-selected fixtures from a recessed output switching socket of the switching interceptor.

4 Claims, 5 Drawing Sheets

MODULAR INTERCONNECTING WIRING SYSTEM WITH MOLDED MATING COMPONENTS

RELATED APPLICATION

This application is a continuation of U.S. Pat. application Ser. No. 06/868,293, filed May 28, 1986.

FIELD OF THE INVENTION

The invention relates to a system for wiring together several light fixtures and more particularly to wiring together light fixtures of a lighting installation of a type used in an office building.

BACKGROUND

Modern office buildings are generally constructed in a manner which permits the sectioning off of selected floor areas according to the wishes of a tenant to provide individual offices etc. in accordance with an office floor plan designed by or for the individual tenant. Since the tenancy on any particular floor of an office building might be expected to change every few years or so, it is important that the lighting installation of each floor of the building be of a type which is relatively easily modified and rewired so that individual offices, conference rooms, kitchen and reception areas etc. can be sectioned off and provided with their own overhead lights and light switch.

For this reason, obvious advantages are provided by a modular wiring system made up of separate interconnecting components for wiring together the light fixtures of a office. The more simple the design and construction of the wiring components, the more advantageous is the system. Likewise, the more simple the method of wiring together the components, the more advantageous is the system. Simpleness of design and wiring method alone are not the only objectives of an efficient wiring system; it is also desirable that the components of the wiring system be easy to work with in that they be manageable and "foolproof" (i.e. designed so that only designated components of the system—the correct components, are capable of being connected to other components in accordance with the intended wiring method).

SUMMARY OF THE INVENTION

In accordance with the present invention there is provided a lighting installation wiring system for electrically wiring together a plurality of lighting fixtures to a single phase power source to permit separate power switching of a selected group of the fixtures, each fixture accommodating across lamp terminals at least one lamp. Included in the system and provided by the invention are a plurality of integrally molded fixture interceptors, each of the fixture interceptors adapted for installation on one of the fixtures and including at least two fixture circuit leads for electrical connection to the lamp terminals, the fixture circuit leads terminating in recessed input and output fixture receptacles, one of the input fixture receptacles adapted for receiving power from a power source.

An integrally molded switching interceptor has recessed input and output switching receptacles in which at least two unswitched circuit leads are terminated, a recessed fixture receptacle in which at least two switched circuit leads are terminated, and a recessed switch drop receptacle in which at least two switch drop leads are terminated. The unswitched and switched circuit leads and the switch drop leads are wired such that the switched circuit leads may be electrically connected to the unswitched circuit leads via remote switching means connected to the switch drop receptacle. At least one joiner cable comprises two joiner circuit leads terminated at first ends in a molded output joiner connector and at second ends in a molded input joiner connector. The output joiner connector is adapted for mating connection to an output fixture receptacle, an output switching receptacle or a fixture receptacle of the switching intercetor such that the joiner circuit leads electrically connect to the fixture circuit leads of a fixture interceptor, the unswitched cicuit leads of the switching interceptor or the switched cicuit leads of the switching interceptor power source, respectively. The input joiner connector is adapted for mating connection to an input fixture receptacle or an input switching receptacle such that the joiner circuit leads electrically connect to the fixture circuit leads of a fixture interceptor or the unswitched circuit leads of the switching interceptor, respectively.

Preferably there is also provided a switching cable comprising two switch leads, the first ends of which terminate in a molded switching connector adapted for mating connection to the switch drop receptacle such that one of the switch leads electrically connects to one of the switched circuit leads of the switching interceptor and the other of the switch leads electrically connects to on of the unswitched circuit leads of the switching interceptor. The second ends of the switch leads are adapted for electrical connection to switching means for electrically connecting together the switch leads.

Preferably, the molded fixture interceptors are configured for self-fastening to a fixture, the fixture interceptor including integral fixture engaging means for engaging the fixture and securing the fixture interceptor to the fixture.

The molded connectors and fixture interceptor receptacles provided by the present invention in combination with the mating configuration of the connectors and recessed receptacles provides a foolproof wiring system which is both manageable and durable, and which provides strong physical connections between the components.

DESCRIPTION OF THE DRAWINGS

The wiring system summarized above is described in greater detail below with reference to specific embodiments of the system components as illustrated in the following diagrams in which like reference numerals refer to like parts throughout.

FIG. 8 illustrates the wiring connections for three components of the wiring system.

DETAILED DESCRIPTION OF A PREFERRED EMBODIMENT

Figure 1:
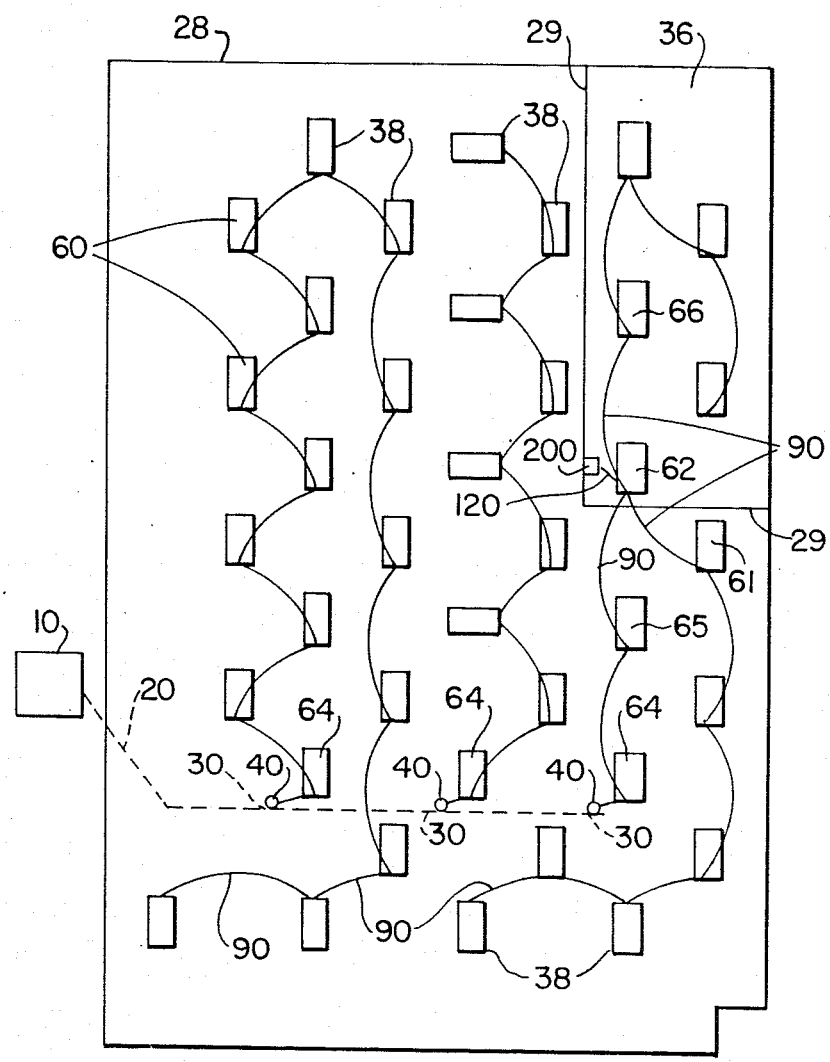
FIG. 1 illustrates a right-hand side portion of a building floor plan of a lighting installation incorporating the wiring system of the present invention, the fixtures of the partitioned area shown in the upper right-hand side of the floor plan being wired for separate switching from the other fixtures shown.

A partial building floor (or ceiling)/lighting installation plan is shown in FIG. 1 of the drawings in which the outside walls 28 define the ceiling and floor area and partitioned walls 29 define the area of an individual office 36 section off from the remaining floor area. A plurality of lighting fixtures 60 are arranged over the floor area as desired. A main power source (single phase) is provided at lighting panel 10, comprising a main power terminal, and a conductive power bus 20 is electrically connected to the main power source and extended away from the main power source along a length of the ceiling area. The bus 20 may be electrical conduit for example EMT or PVC conduit and may be run along the ceiling or installed in the ceiling slab depending upon the building construction. Two main power lines ar provided in the bus 20 the lines together comprising one circuit (of whatever voltage is intended for the lighting installation) and, for safety purposes as required by certain building standards, a ground line is preferably also provided.

Fixtures 60 are electrically interconnected through joiner cables 90 and, preferably, through a starter terminal 40 to the bus 20 in separate groups 38 (three groups being illustrated in FIG. 1). An individual office area 36 is sectioned off from the floor area thereby requiring the selection of the fixtures over this area for separate switching capability apart from those over the remaining floor area. Accordingly, the first selected fixture 62 and each successive (non-first) selected fixture 66 over the individual office area 36 (themselves being electrically connected together through joiner cables 90) are electrically connected through a switching cable 120 to a switch 200 which may be operated to electrically connect or disconnect (through the joiner cables 90 and a starter terminal 40), the selected fixtures 62, 66 to the power bus (i.e. power supply) 20.

One or more non-selected fixtures 65 may be connected between the first selected fixture 62 and the power bus 20, the first fixture connected to the power bus for convenience being referred to herein as a "starter" fixture 64. If a starter terminal 40 is selected for use in the system, it preferbly may be a cable (for example of 20 foot length) having at one end a starter connector 50 for connecting one of the fixture groups 38 to the power bus 20 at a preselected location on the bus. Thus, in the embodiment shown in FIG. 1, three connector-type power access points 30 are provided on the power bus 20 by means of starter terminals (cables) 40. Depending upon the size of the floor area in any particular application an increased or decreased number of starter terminals 40 may be installed as desired with a view to increasing or reducing the number of fixtures in each group 38. Likewise, depending upon the floor area, a more extensive conduit bus network might be desired.

It will be apparent to anyone skilled in the electrical trade that the size and type of power leads (i.e. conductors for carrying current) which are suitable for connecting together specific electrical components is governed inter alia by the power to be provided by the lead and the voltage and current to be applied to it. Accordingly, the description herein referring to power or circuit "leads" is intended to mean suitable leads for the wiring installation contemplated, the specifics of which may be readily selected by anyone skilled in the electrical trade.

To provide separate switching capability to a group of selected fixtures 62, 66, being a subgroup of a group of fixtures 38 as illustrated in FIG. 1, the first selected fixture 62 is electrically connected to a switching interceptor (i.e. a switch tap box) 150 through a joiner cable 90. Power from the bus 20 is supplied to the switching interceptor 150 through a starter terminal 40 and joiner cables 90 linking together non-selected fixtures 65. This power is then supplied from the switching interceptor 150 to a first non-selected fixture 61 and each successive non-selected fixture of the group 38 through joiner cables 90. A switching cable 120 electrically connects a wall switch 200 of the individual office 36 to the switching interceptor 150 which is internally wired in an appropriate manner so that the power supplied to the switching interceptor 150 from the bus 20 is provided through the switch 200 to the fixture interceptor 80 of the first selected fixture 62 to which the switching interceptor 150 is electrically connected (i.e. via a joiner cable 90).

Accordingly, the first selected fixture 62 is selectively provided power or not provided powe from the bus 20 depending upon the position of the switch 200. This "switched" power is then provided to the remaining ones of the selected fixtures 66 (i.e. the non-first selected fixtures) through joiner cables 90, the last of the selected fixtures ending the series of cable joined selected fixtures. Consequently, while each non-selected fixture is directly provided with power from the bus 20, each selected fixture is provided with switch-controlled power from the bus 20 controlled by switch 200 so that the lamps of the fixtures above the individual office 36 to be separately switched may be locally controlled from within the office 36 via an ordinary wall switch. As will be appreciated by the reader, this arrangement of selected and non-selected fixtures may be readily changed to provide any desired number and configuration of individual groups of selected fixtures to be individually switched from the bus 20.

Figure 3:
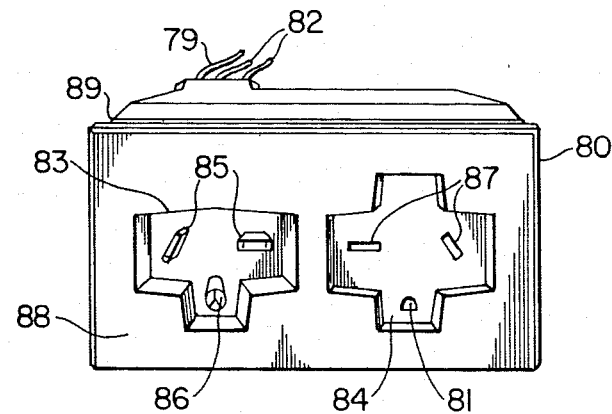
FIG. 3 shows a front end perspective view of a fixture interceptor in accordance with the present invention.
Figure 7:
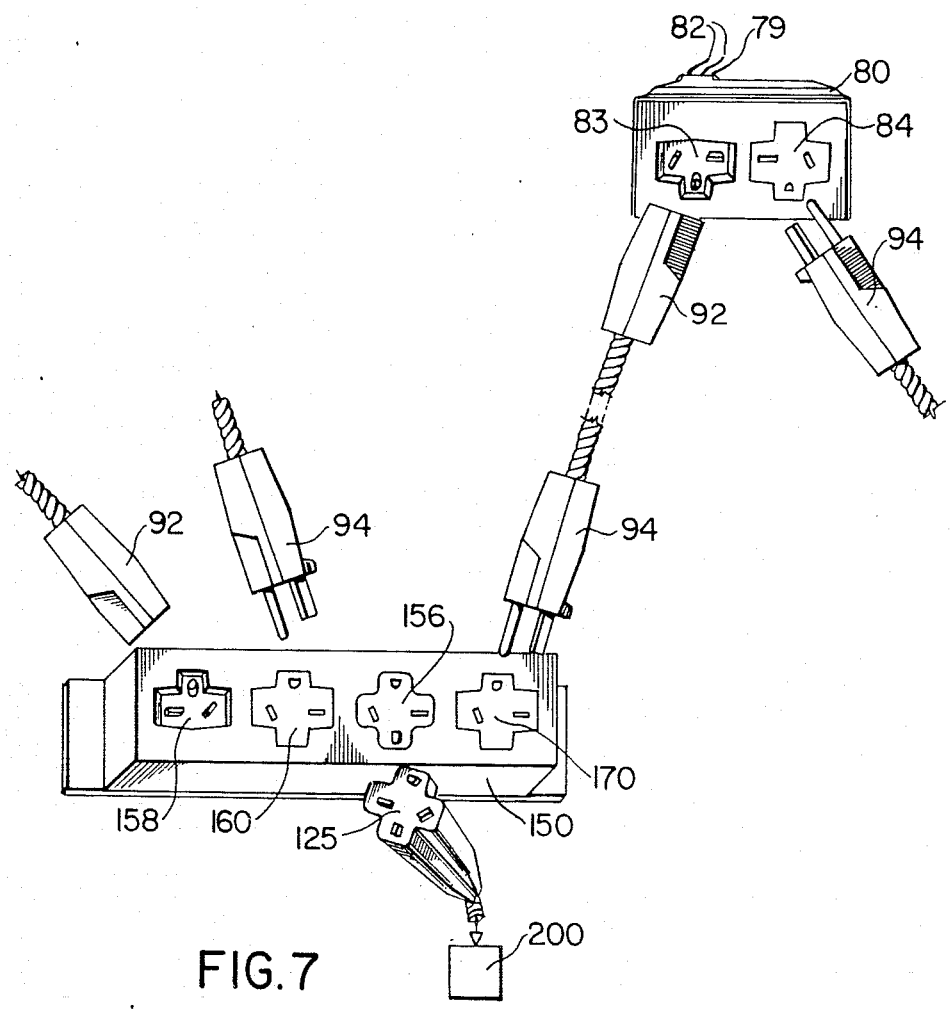
FIG. 7 illustrates the interconnection of several components used in the wiring system.

As already stated above, a fixture interceptor module 80 is installed in each fixture 60 (including all selected and non-selected fixtures of a group 38). As shown in FIGS. 3 and 7, each fixture interceptor 80 has an input fixture receptacle 83 for receiving power and an output fixture receptacle 84 for supplying power, each receptacle formed as a recessed socket below the face 88 and each having a shape distinct from the other for mating connection with the joiner cables 90. The sockets 83, 84 are electrically connected together through two fixture circuit leads 82 and a ground wire 79 which are terminated in pins 85, 86 and pin sockets 87, 81 of the input and output fixture sockets, respectively.

The fixture interceptor 80 is integrally formed of a molded thermoplastic material of a type suitable for the power levels to be provided to the fixture and is provided with a continuous outer groove 89 around the perimeter for engagement with the walls of an aperture formed in the housing of the fixture. To install the fixture interceptor 80, the fixture circuit leads 82 provided at the back end of the fixture interceptor 80 are electrically connected to the lamp terminals of the fixture (and the ground wire 79 to the fixture housing) and the fixture interceptor 80 is then inserted and pressed into the housing aperture until the groove 89 snaps into engagement with the walls of the aperture to provide a solid attachment. This self-fastening means of attachment provides a simple but effective means of securing the fixture interceptors 80 to the fixtures.

Figure 6:
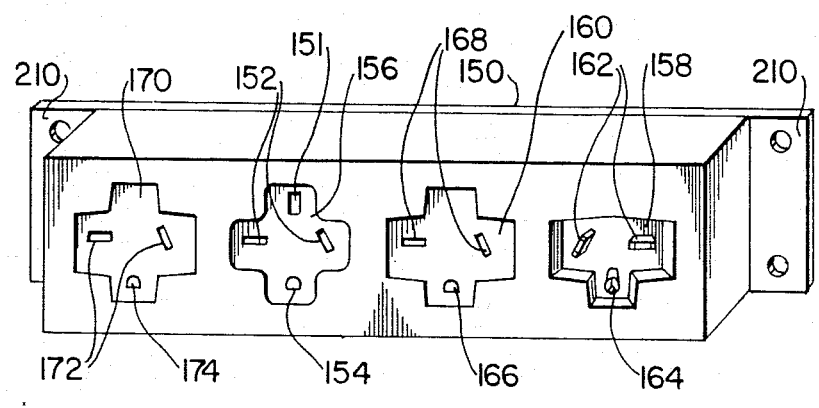
FIG. 6 shows a front end perspective view of a switching interceptor suitable for use in the wiring system.

In similar fashion to the fixture interceptor, the switching interceptor 150 is integrally formed of a suitable molded thermoplastic material as shown in FIGS. 6 and 7. The face 161 of the switching interceptor 150 (which, functionally, is a switch tap box) has a switch drop receptacle 156, an input switching receptacle 158, an output switching receptacle 160 and a fixture receptacle 170 each formed as recessed sockets below the face 161 and each having a shape distinct from the others for mating with joiner cables 90 and switching cable 120.

Figure 8A:
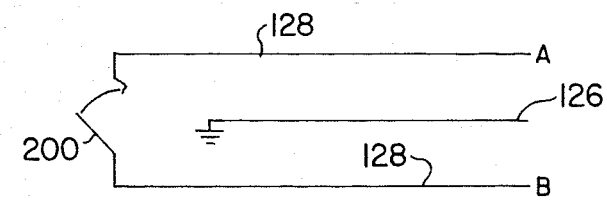
FIG. 8(a) is a wiring diagram showing electrical connections for the switching cable and wall switch shown in FIG. 7.
Figure 8B:
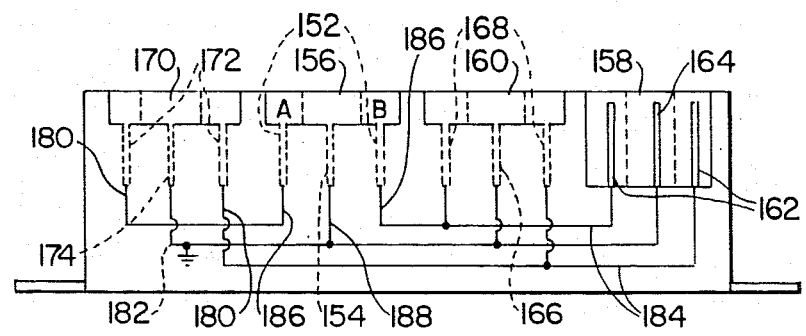
FIG. 8(b) is a wiring diagram showing electrical connections in the switching interceptor shown in FIGS. 6 and 7.
Figure 8C:
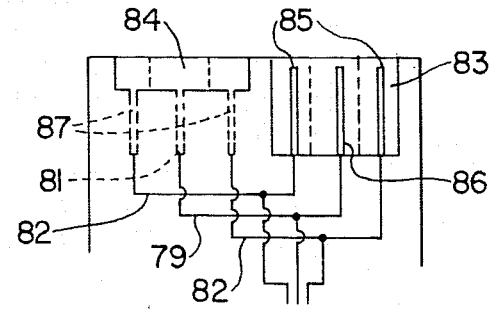
Figure 8(c) is a wiring diagram showing electrical connections in the fixture interceptor shown in FIGS. 3 and 7.

FIG. 8 illustrates a wiring arrangement suitable for the switching interceptor 150 (FIG. 8(b)), the fixture interceptor 80 (FIG. 8(c)) and the switching cable 120 and wall switch 200 (FIG. 8(a)). As mentioned above, the pins 85, 86 and pin sockets 87, 81 of input and output fixture receptacles 83, 84 are electrically connected together via fixture circuit leads 82 and (preferably) ground wire 79. Likewise, pins 162, 164 and pin sockets 166, 168 of the input and output switching receptacles 158, 160 are electrically connected together via unswitched circuit leads 184 and ground wire 182. For the purpose of switching the unswitched circuit leads 184 via switch 200 one of the unswitched circuit leads 184 is electrically connected across switch 200 and returned to the switch drop receptacle 156 and fixture receptacle.

Figure 5:
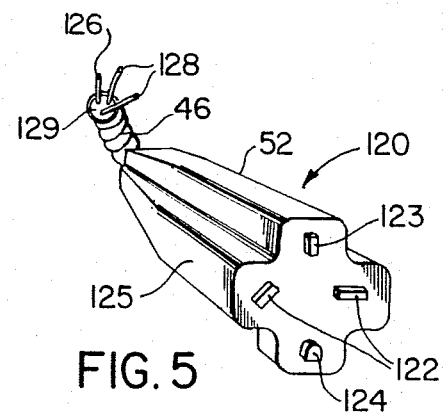
FIG. 5 shows a front end perspective view of a switching cable suitable for use in the wiring system.

As shown in FIG. 8(b) a first one of the unswitched circuit leads 184 is electrically connected to a first one of pin sockets 152 of the switch drop socket (receptacle) 156 and a second pin socket 152 is electrically connected to a first one of pin sockets 172 of the fixture receptacle 170. A second pin socket 172 of fixture receptacle 170 is electrically connected to a second unswitched circuit lead 184. Since the two leads of the fixture receptacle 170 are switch-controlled leads they are referred to herein as switched circuit leads 180. Ground wire 182 is connected to both pin socket 154 of the switch drop socket 156 and pin socket 174 of the fixture receptacle 170. (Pin socket 151 of switch drop socket 156 and pin 123 of switching cable 120 shown in FIGS. 5 and 6 are unused and are not required for the switching connection described herein—as spares they are included for possible utilization in connection with another purpose as desired.)

When switching cable 120 is connected to switch drop socket 156, the switch leads 128 connect the unswitched circuit lead 184 at pin socket "B" to the wall switch 200 such that the power provided at the input switching socket 158 is transmitted to pin sockets 172 of the fixture receptacle 170 if the switch 200 is in a closed position but not if the switch 200 is in an open position. Since the fixture receptacle 170 (and pin sockets 172) connects via a joiner cable 90 to the input fixture socket 83 of the first selected fixture 62 (i.e. of the group of fixtures to be separately switched) the switched power is transmitted to all of the selected fixtures 62, 66 which are electrically connected together via joiner cables 90.

Figure 2:
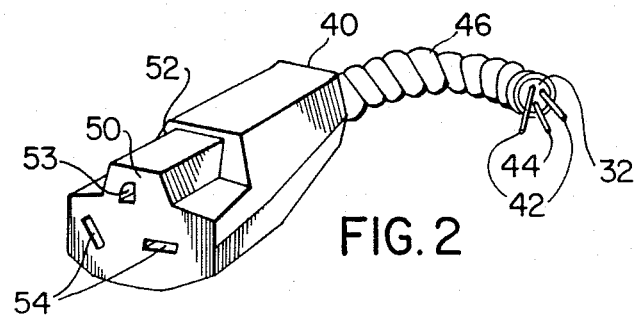
FIG. 2 shows a perspective view of a starter cable which is used in the preferred wiring system.
Figure 4:
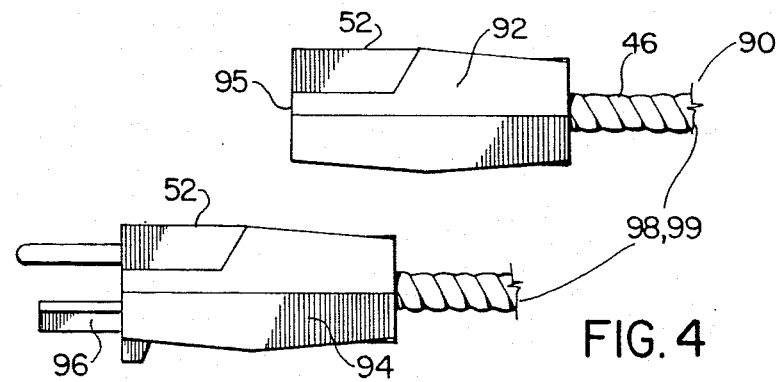
FIG. 4 shows a side perspective view of a joiner cable suitable for use in the wiring system.

Apart from the switching interceptor 150 and the fixture interceptor 80 the remaining components of the modular wiring system are the joiner cables 90 (shown in FIG. 4), the switching cable 120 (shown in FIG. 5) and the starter terminal 40 (as shown in FIG. 2 in the form of a starter cable 40). Each of the cables includes two covered power leads and a ground wire together wrapped in an insulating material and encased in a flexible protective metal sheath 46, the length of the cables being selected as desired. The starter cable 40 has at one end a thermoplastic molded starter connector 50 (molded around sheath 46) with internal pin sockets 53, 54 electrically connected to starter circuit leads 42 and a ground wire 44, the other end 32 being adapted for electrical connection to the power bus 20. Similarly, the switching cable 120 has at one end a thermoplastic molded switching connector 125 with protruding pins 122, 124 (an unused pin 123 also being shown) internally wired (i.e. electrically connected to switch leads 128 and a ground wire 126 (which, as shown, are also encased in a metal sheath 46 the connector 125 being molded around the sheath). The other end 129 is adapted for electrical connection to the switch 200.

A joiner cable 90 is used to connect together two fixture interceptors 80 or a switching interceptor 150 and a fixture interceptor 80 (or, if desired, a starter terminal (cable) 40 and a fixture interceptor 80) as required according to the floor/lighting installation plan. For example, it may be of length 15 ft. or various lengths as desired. One end of the joiner cable 90 terminates in a thermoplastic molded input joiner connector 92 and the other end terminates in a thermoplastic molded output joiner connector 94, the input joiner connector 92 having internal pin sockets 95 electrically connected to joiner circuit leads 98 and a ground wire 99 and the output joiner connector 94 having protruding pins 96 electrically connected to joiner circuit leads and ground wire 98, 99. As for the starter cable and switching cable, the joiner circuit leads 98 and ground wire 99 of the joiner cable 90 are encased in a metal sheath 46, the connectors 92, 94 being molded around the sheath.

As noted above, each of the connectors 50, 125, 92 and 94 of the system components are integrally formed of a molded thermoplastic material around the sheath 46. Preferably each has an elongated shape and size which lends itself to convenient handling by a workperson, a top front surface portion 52 being transversely ridged to facilitate grasping. As a result, the cable modules are easy to handle and install in a lighting installation. Additionally, each connector is mated with the socket for which it is designed to connect so that it is difficult for a workperson to make an incorrect connection. The combination of connector pins or pin sockets and the shape of the connectors enable only correct connections to be made. (This in turn means that a lesser skilled workperson may satisfactorily perform the installation of the wiring system described herein, saving time and expense.)

As shown in the drawings, the starter connector 50 mates with the input fixture receptacle 83 (and also with the output joiner connector 94) so that the step of connecting together the fixtures of a group 38 may be accomplished by plugging the starter cable 40 into the receptacle 83 of the starter fixture 64 (or, alternatively, by attaching the starter cable 40 to a joiner cable 90 and plugging the joiner cable into the starter fixture 64). The switching connector 125 mates only with the switch drop receptacle 156. The input joiner connector 92 mates with both the input fixture receptacle 92 and the input switching receptacle 158. Similarly, the output joiner connector 94 mates with the output fixture receptacle 84, the output switching receptacle 160 and the fixture receptacle 170 (as well as the starter connector 50). Since each receptacle is formed as a recessed socket into which the mated connector fits, the connection of connector to receptacle is strong and resistant to knocking and the like. The walls of the recessed portion of the receptacle provide a protecting and engaging subsurface area for receiving the connector.

As will be appreciated by the reader, the wiring method and system of the invention provides a simple-to-use plug-in-type modular wiring means having few components. Each component may be inexpensively made and is convenient to work with. The starter terminal 50 may be installed on the bus 20 at any number of locations, as desired, for future use (e.g. in the event that a larger number of fixture groups 38 is desired later on) thereby eliminating the need to hard-wire "live" power leads when a lighting arrangement is desired to be changed, the only lead connection required to be made being the connection of the "dead" leads of switching cables to wall switches.

To make the above-described components of the wiring system, the connectors and interceptors are molded according to well-known techniques for molding thermoplastic materials from a mold (which may be configured as desired). Of course, the particular configurations illustrated are not necessary to produce the results provided by the invention and numerous other designs might be equally effective. The invention claimed herein is not limited to the specific embodiments illustrated in the drawings and described above. Rather, the scope of the invention claimed is defined by the appended claims.

I claim:

1. A modular electrical wiring system for a lighting installation for electrically wiring a plurality of lighting fixtures to a power source to permit separate power switching of a selected group of said fixtures, each fixture accommodating at least one lamp across lamp terminals, said system comprising:

(a) a plurality of fixture interceptors, each of said fixture interceptors being adapted for installation on one of said fixtures and comprising: (i) a body integrally formed of a molded thermoplastic material whereby said body includes a first recess defining an input fixture receptacle and a second recess defining an output fixture receptacle, each said first and second recesses formed below a face of said body and having a predetermined distinct shape defined by an outer wall of each said recess; and, (ii) at least two fixture circuit leads adapted for electrical connection to said lamp terminals, said fixture circuit leads terminating in corresponding pins and pin sockets of said input and output fixture receptacles, respectively, said input fixture receptacle being adapted for receiving power from a power source and said pin sockets terminating below said second recess;

(b) a switching interceptor comprising: (i) a body integrally formed of a molded thermoplastic material whereby said body includes a third recess defining a input switching receptacle and a fourth recess defining an output switching receptacle, each said third and fourth recesses being formed below a face of said body and having a shape corresponding to the shapes of said first and second recesses, respectively, and each said shape being defined by an outer wall of said third and fourth recesses, respectively, a fifth recess defining a fixture receptacle said fifth recess being formed below a face of said body and having a shape corresponding to said shape of said second recess, said shape being defined by an outer wall of said fifth recess, and a sixth recess defining a switch drop receptacle said sixth recess being formed below a face of said body and having a predetermined distinct shape defined by an outer wall of said sixth recess; (ii) at least two unswitched circuit leads terminating in corresponding pins and pin sockets of said input and output switching receptacles, respectively; (iii) at least two switched circuit leads terminating in corresponding pin sockets of said fixture receptacle; and, (iv) at least two switch drop leads terminating in corresponding pin sockets of said switch drop receptacle, each of said pin sockets terminating below the recess defining its respective receptacle and said unswitched and switched circuit leads and said switch drop leads being wired such that said switched circuit leads may be electrically connected to said unswitched circuit leads via remote switching means connected to said switch drop receptacle; and, (c) at least one joiner cable comprising at a first end thereof an output joiner connector integrally formed of a molded thermoplastic material and at a second end thereof an input joiner connector integrally formed of a molded thermoplastic material and at least two joiner circuit leads extending between said connectors, said connectors being molded around said leads, said leads terminating at said first end in corresponding pins of said output joiner connector and at said second end in corresponding pin sockets of said input joiner connector, said pin sockets terminating below a face of said input joiner connector, the shape of said output joiner connector corresponding to the shape of said second recess but not said first recess, said walls of said second, fourth and fifth recesses providing protecting and engaging subsurface areas for receiving said output joiner connector for electrically connecting said joiner circuit leads to the fixture circuit leads of a fixture interceptor, the unswitched circuit leads of a switching interceptor or the switched circuit leads of a switching interceptor, respectively, and the shape of said input joiner connector corresponding to the shape of said first recess, said walls of said first and third recesses providing protecting and engaging subsurface areas for receiving said input joiner connector for electrically connecting said joiner circuit leads to the fixture circuit leads of a fixture interceptor or the unswitched circuit leads of a switching interceptor, respectively.

2. A wiring system according to claim 1, said joiner circuit leads being encased in a metal sheath and said input and output joiner connectors being molded around said sheath.

3. A wiring system according to claim 2 and further comprising a switching cable comprising at a first end thereof a switching connector integrally formed of a molded thermoplastic material and extending therefrom at least two switch leads, said leads terminating in said switching connector in corresponding pins, the shape of said switching connector corresponding to the shape of said sixth recess but not to either of said first or second recesses, said outer wall of said sixth recess providing a protecting and engaging subsurface area for receiving said switching connector and electrically connecting a first one of said switch leads to one of said unswitched circuit leads of said switching interceptor and a second one of said switch leads to one of said switched circuit leads of said switching interceptor, the second end of said switching cable being adapted for electrically connecting together said first and second switch leads via remote switching means.

4. A wiring system according to claim 3, said fixture interceptors being adapted for self-fastening to said lighting fixtures, each of said fixture interceptors further comprising a continuous groove formed in the sides of said body around the perimeter thereof.

* * * * *